United States Patent [19]

Andrepont et al.

[11] Patent Number: 4,541,248
[45] Date of Patent: Sep. 17, 1985

[54] CONSTANT TEMPERATURE REFRIGERATION SYSTEM FOR A FREEZE HEAT EXCHANGER

[75] Inventors: John S. Andrepont, Lisle; Raymond Korzonas, Chicago, both of Ill.

[73] Assignee: Chicago Bridge & Iron Company, Oak Brook, Ill.

[21] Appl. No.: 561,891

[22] Filed: Dec. 15, 1983

[51] Int. Cl.⁴ .............................................. F17C 13/00
[52] U.S. Cl. .......................................... 62/54; 62/123; 165/141; 165/142; 220/85 VS
[58] Field of Search ........................... 62/54, 123, 532; 220/85 VR, 85 VS; 165/141, 142

[56] References Cited

U.S. PATENT DOCUMENTS

| | | | |
|---|---|---|---|
| 3,108,446 | 10/1963 | Sohda et al. | 62/54 |
| 3,132,489 | 5/1964 | Maher et al. | 62/54 |
| 3,150,495 | 9/1964 | Reed | 62/54 |
| 3,246,480 | 4/1966 | Rigby | 62/54 |
| 3,303,660 | 2/1967 | Berg | 62/54 |
| 3,369,371 | 2/1968 | Holly et al. | 62/54 |
| 3,733,847 | 5/1973 | Powell | 62/54 |
| 4,332,136 | 6/1982 | Quack | 62/54 |

*Primary Examiner*—Ronald C. Capossela
*Attorney, Agent, or Firm*—Marshall, O'Toole Gerstein, Murray & Bicknell

[57] ABSTRACT

A freeze concentrator of the shell and tube type containing a pool of liquid cryogen within the shell, the concentrator being adapted to maintain a constant temperature within the liquid cryogen. The temperature control comprises a flash tank located above the level of liquid cryogen within the concentrator, to which the vapors evolved from the boiling cryogen are passed. The flash tank is provided with a condenser for condensing the cryogen vapor which enters the flash tank, the resulting liquid cryogen collecting within the flash tank and being recycled therefrom by gravity to the pool of cryogen in the exchanger.

7 Claims, 2 Drawing Figures

CONSTANT TEMPERATURE REFRIGERATION SYSTEM FOR A FREEZE HEAT EXCHANGER

The present invention relates to apparatus for concentrating a liquid mixture containing dissolved or suspended solids by freezing a portion of the liquid carrier or solvent and removing it from the mixture. More particularly, this invention relates to an improved freeze concentrating apparatus of the shell and tube type, employing a boiling liquid cryogen in the shell for supplying refrigeration and provided with means for maintaining the cryogen at a constant temperature.

BACKGROUND OF THE INVENTION

It is known, as disclosed for example in U.S. Pat. Nos. 4,286,436 and 4,335,581, to employ a tube and shell heat exchanger in processes for freeze concentrating liquid mixtures. In such use, the exchanger typically consists of a plurality of vertical freeze tubes through which the mixture to be concentrated passes, and an external shell which, together with appropriate tube sheets at the upper and lower ends of the freeze tubes, defines a chamber within which an appropriate cooling fluid, typically a liquefied normally gaseous cryogen or refrigerant, such as ammonia or a Freon refrigerant, is contained. The cryogen is maintained at its boiling point at the pressure conditions which exist within the shell. Heat extracted from the liquid mixture passing through the freeze tubes converts a portion of the liquid cryogen to vapor, which is withdrawn from the shell. Additional liquid cryogen is supplied to the shell as needed to replace that withdrawn as vapor.

In the operation of such a freeze concentrator, it is important that the temperature of the liquid cryogen be maintained at a constant value, for several reasons. If the temperature falls below a design value, either within the entire pool or at localized areas along the length of the freeze tubes, the solvent or liquid carrier in the mixture passing through the freeze tubes may freeze at a rate higher than intended and deposit on the tube walls, thus leading to blockage of the freeze tubes. In addition, the existence of localized zones of different refrigerant temperature will result in uneven heat transfer, and thus in an overall reduction in the cooling capacity of the freeze exchanger. Accordingly, there exists a need for a freeze concentrator of the tube and shell type in which the temperature of the cryogen can be maintained at a desired constant value in a simple and economical manner requiring a minimum of process controls.

SUMMARY OF THE INVENTION

In accordance with the invention, there is provided a freeze concentrator or heat exchanger of the shell and tube type adapted to contain a pool of liquid cryogen within the shell, the concentrator being provided with means for maintaining a constant temperature within the liquid cryogen. The temperature control means comprises a flash tank located above the level of liquid cryogen within the concentrator, to which the vapors evolved from the boiling cryogen are passed. The flash tank is provided with condensing means for condensing the cryogen vapor which enters the flash tank, the resulting liquid cryogen collecting within the flash tank and being recycled therefrom by gravity to the pool of cryogen in the exchanger.

In one embodiment of the invention, the condensing means comprises a conventional condenser or heat exchanger located within the flash tank, the heat exchanger being cooled sufficiently to cause condensation of the cryogen vapor which enters the flash tank. In another embodiment, the condensing means comprises a compressor, to the input of which is supplied the vapor entering the flash tank, a condenser for condensing the compressed vapor, and an expansion valve receiving the condensed cyrogen, with the outlet of the expansion valve communicating with the flash tank.

DETAILED DESCRIPTION OF THE DRAWINGS

Figure 1:
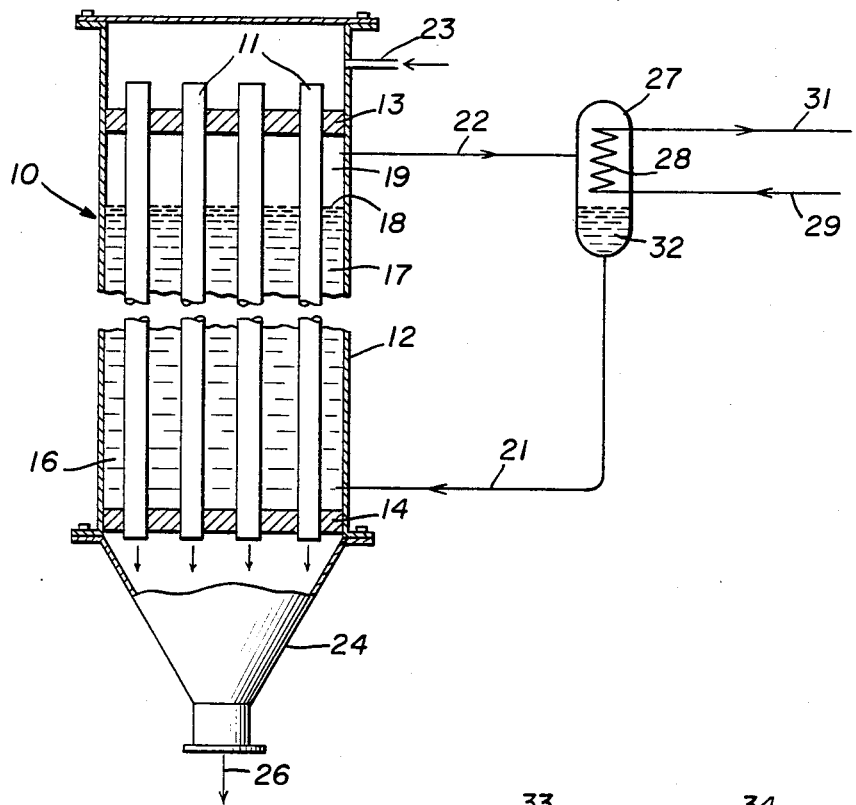
FIG. 1 is a vertical view, in partial section, of one embodiment of the invention.

With reference to the drawings, the invention comprises a freeze concentrator or exchanger 10 of the tube and shell type comprising a plurality of vertical freeze tubes 11 enclosed within a vertical cylindrical shell 12. Upper tube sheet 13 and lower tube sheet 14, located respectively adjacent the upper and lower ends of the freeze tubes, are sealed by appropriate means, e.g., welding, to both shell 12 and tubes 11, thereby defining a chamber or shell-space 16 within which is contained a pool 17 of liquid cryogen, suitably a normally gaseous refrigerant such as ammonia or a Freon refrigerant gas. The level or pseudo-level 18 of liquid cryogen is maintained below the level of upper tube sheet 13, thereby providing a vapor (or predominantly vapor) zone 19 in the shell. As used herein, "pseudo-level" refers to the level of cryogen liquid which would provide a hydrostatic pressure equivalent to that actually provided by the fluid in shell-space 16, which fluid is actually part cryogen liquid and part cryogen vapor. Shell 12 is provided with a suitable lower fitting (not shown) at a point adjacent the lower end of the shell, through which liquid cryogen can be supplied through line 21. A similar fitting (not shown), adjacent the upper end of shell 12 and communicating with vapor zone 19, permits removal of vapor, or mixed vapor and liquid from zone 19 by means of line 22.

The liquid mixture to be concentrated, which is introduced into freeze exchanger 10 via line 23 at a point above upper tube sheet 13, enters the open upper ends of freeze tubes 11 and passes therethrough, exiting from the tube lower ends into header 24 which collects the partially frozen mixture into a single stream 26 for further processing.

During operation of the freeze exchanger, the liquid cryogen 17 within shell 12 is at its boiling point under the pressure which exists within the exchanger, i.e., the cryogen vapor in zone 19 is saturated and in equilibrium with liquid cryogen 17. As the liquid mixture to be concentrated passes through freeze tubes 11, heat is extracted from the mixture and absorbed by the cryogen, causing the cryogen to boil and evolve a quantity of cryogen vapor having a heat of vaporization equal to the heat energy given up by the liquid mixture.

In one embodiment of the invention, shown in FIG. 1, the cryogen vapor produced by boiling of liquid cryogen is transferred via line 22 to a flash tank 27 containing a condenser 28, such as a plate, a helical coil, or similar heat exchanger, maintained at a temperature sufficiently low to cause condensation of the vapor, by a conventional cooling fluid supplied through lines 29 and 31 from an appropriate source, not shown. The lower end of flash tank 27 communicates via line 21 to the lower end of shell 12 above lower tube sheet 14. The cryogen vapor which is condensed within flash tank 27 accumulates as a pool 32 within the flash tank, the level of which is at or only slightly above the level or pseudo-level 18 of the cryogen within shell 12, because of the free communication between the vessels afforded by line 21. Flow through line 21 occurs as a result of the slight differential head between flash tank 27 and shell space 16 during vaporization of the cryogen created by differences in the actual or psuedo liquid levels in these vessels. To maintain condenser 28 in contact with the vapor entering flash tank 27 through line 22, rather than having the condenser submerged within pool 32, the flash tank is located at an elevation sufficiently high that the condenser will at all times remain within the vapor space above pool 32.

Figure 2:
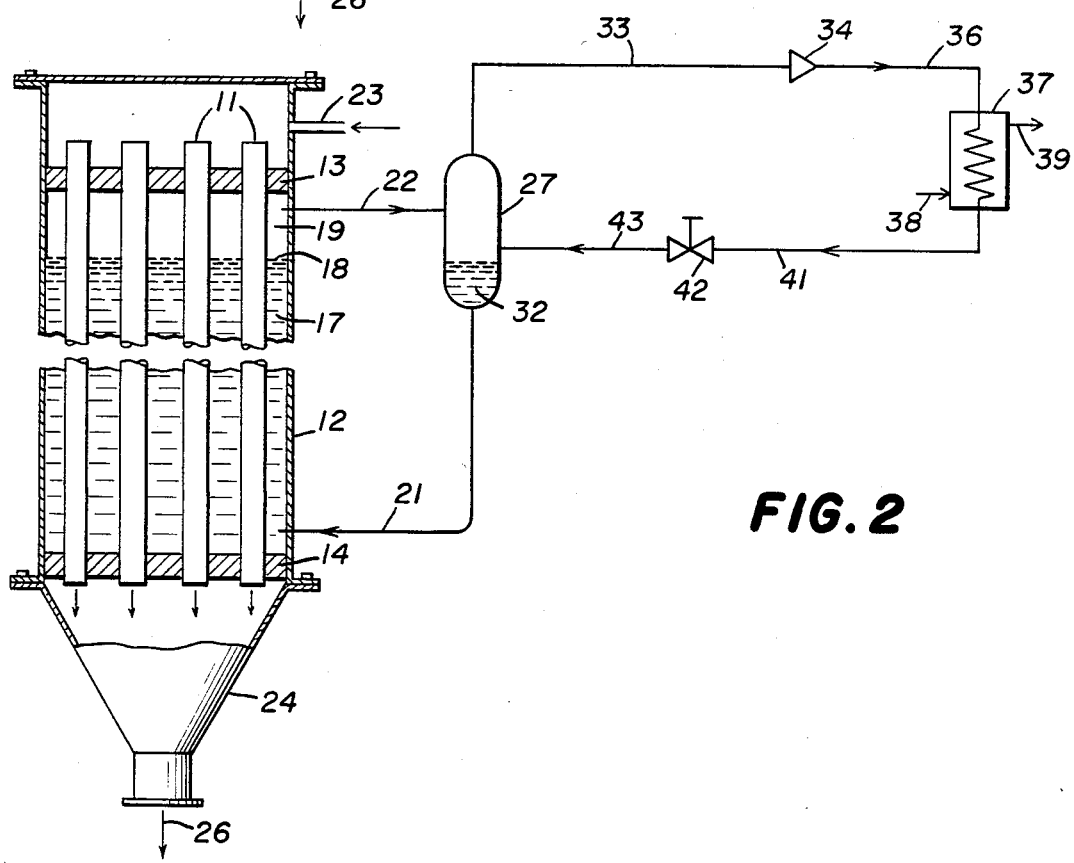
FIG. 2 is a view similar to that of FIG. 1 illustrating a second embodiment of the invention.

In a second embodiment of the invention, shown in FIG. 2, flash tank 27 is provided with a conduit 33 through which cryogen vapor entering the flash tank is conveyed to the inlet of compressor 34. The compressed vapor leaving compressor 34 is conducted via conduit 36 to condenser 37 wherein the compressed vapor is cooled and condensed by indirect heat exchange with a suitable cooling fluid, e.g., cold water, entering and leaving the heat exchanger via lines 38 and 39 respectively. The condensed cryogen is introduced via line 41 to expansion valve 42, the outlet of which communicates via line 43 with flash tank 27. The sudden release of pressure of the condensate on passage through valve 42 results in the formation of cooled liquid cryogen, which accumulates in pool 32 in the bottom of flash tank 27, and vapor in equilibrium therewith. As in the case of the embodiment of FIG. 1, flash tank 27 is positioned at an elevation such that pool 32 within flash tank 27 does not completely fill the flash tank.

In the operation of the embodiments of FIG. 1 and FIG. 2, condenser 28 (FIG. 1) or the compression-expansion loop consisting of compressor 34, condenser 37 and expansion valve 42 (FIG. 2), produces liquefied cryogen at a constant temperature in equilibrium with saturated vapor in flash tank 27. Because of the free communication through line 22 between flash tank 27 and vapor zone 19 in freeze exchanger 10, the vapor phases within freeze exchanger 10 and flash tank 27 are maintained at the same constant pressure. The pool 17 of boiling cryogen within shell 12 is in equilibrium with the saturated vapor within vapor zone 19 and accordingly is also maintained at the equilibrium temperature corresponding to the constant pressure. Thus, the temperature of cryogen pool 17 will be maintained at an essentially constant value, avoiding fluctuations which might lead to blockage within freeze tubes 11, and also maximizing the overall heat transfer rate of the freeze exchanger.

The foregoing detailed description has been given for clearness of understanding only and no unnecessary limitations should be understood therefrom, as modifications will be obvious to those skilled in the art.

What is claimed is:

1. In a freeze concentrator comprising a plurality of freeze tubes, and a shell surrounding said freeze tubes and forming a chamber adapted to contain a boiling liquid cryogen with a vapor zone above the liquid level of the cryogen, the improvement comprising:
a flash tank at an elevated location relative to the liquid level of said cryogen in the shell chamber;
vapor conduit means communicating from said shell chamber vapor zone to said flash tank;
condensing means associated with said flash tank for condensing the vapor of said cyrogen entering said tank, the condensed vapor being collected as liquid cryogen therein; and
liquid conduit means communicating from said flash tank to said shell chamber for returning liquid cryogen to said shell chamber by gravity flow,
said chamber, flash tank, vapor conduit means and liquid conduit means forming a sealed, substantially air-free system.

2. A freeze concentrator in accordance with claim 1 wherein said condensing means comprises a heat exchanger within said flash tank and means for cooling said heat exchanger to a temperature sufficiently low to condense said vapor.

3. A freeze concentrator in accordance with claim 2 wherein said flash tank is elevated relative to the level of liquid cryogen in said chamber.

4. A freeze concentrator in accordance with claim 1 wherein said condensing means comprises a compressor having an inlet communicating with said flash tank for compressing the entering vapor, a cooler for cooling the compressed vapor and an expansion valve having an inlet receiving the compressed vapors and an outlet communicating with said flash tank.

5. A freeze concentrator in accordance with claim 1 wherein said liquid conduit means communicates between the lower end of said flash tank and the lower end of said chamber.

6. A freeze concentrator in accordance with claim 1 in which said vapor conduit means communicates directly between the vapor phases within said chamber and said flash tank and maintains said vapor phases at essentially the same pressure.

7. A freeze concentrator in accordance with claim 1 wherein the flash tank is sufficiently elevated with respect to the level of cryogen in said chamber to provide an effective differential pressure head resulting in liquid cryogen flow into said chamber from said flash tank.

* * * * *